United States Patent
Prioretti et al.

(10) Patent No.: US 6,783,605 B2
(45) Date of Patent: Aug. 31, 2004

(54) HIGH SPEED OXYACETYLENE CUTTING OF A THICK STEEL PART AND DEVICE THEREFOR

(76) Inventors: Guy Prioretti, 13 rue Alexandre Dreux 57100, Thionville (FR); Véronique Prioretti, 11 rue Alexandre Druex 57100, Thionville (FR); Francoise Prioretti-Hacking, 13 rue Alexandre Dreux 57100, Thionville (FR); Jean-Michel Prioretti, 2 rue Pellerin 57100, Manom (FR)

( * ) Notice: Subject to any disclaimer, the term of this patent is extended or adjusted under 35 U.S.C. 154(b) by 70 days.

(21) Appl. No.: 10/239,505
(22) PCT Filed: Mar. 15, 2001
(86) PCT No.: PCT/FR01/00772
§ 371 (c)(1),
(2), (4) Date: Sep. 23, 2002
(87) PCT Pub. No.: WO01/70443
PCT Pub. Date: Sep. 27, 2001

(65) Prior Publication Data
US 2003/0037842 A1 Feb. 27, 2003

(30) Foreign Application Priority Data
Mar. 23, 2000 (FR) .............................. 00 03727

(51) Int. Cl.$^7$ ................................................ B23K 7/10
(52) U.S. Cl. ........................................ 148/205; 266/67
(58) Field of Search ..................... 266/48, 67; 148/194, 148/205

(56) References Cited

U.S. PATENT DOCUMENTS

| | | | | |
|---|---|---|---|---|
| 2,138,400 A | * | 11/1938 | Deming | ........................ 266/74 |
| 2,415,815 A | * | 2/1947 | Deming | ........................ 148/199 |
| 3,852,126 A | * | 12/1974 | Yaguchi et al. | ........................ 148/205 |

* cited by examiner

Primary Examiner—Scott Kastler
(74) Attorney, Agent, or Firm—Sughrue Mion, PLLC

(57) ABSTRACT

The invention relates to a method and apparatus for oxygen-cutting thick pieces of steel at high speed. In accordance with the invention an oxygen-cutting torch (30) held at a predetermined height above the piece (1) to be cut and a slot torch (20) comprising at least one blade nozzle (25) that travels inside the cut slot (1.3) are moved synchronously. The blade nozzle (25) emits at least one jet of heating and/or oxygen-cutting fluids through its leading edge to strike the heating edge of the slot where it combines with the jet of oxygen-cutting fluids emitted by the oxygen-cutting torch (30) to form a leading edge (1.4) of the slot having a profile in the form of a broken line.

14 Claims, 4 Drawing Sheets

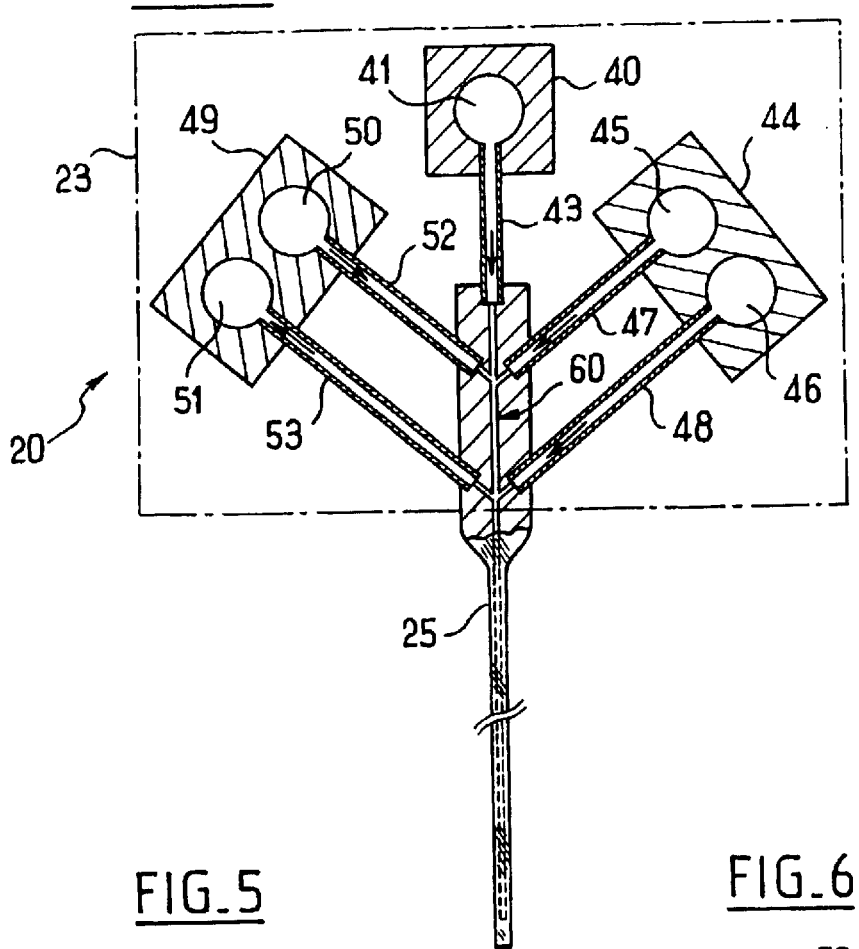
FIG_4
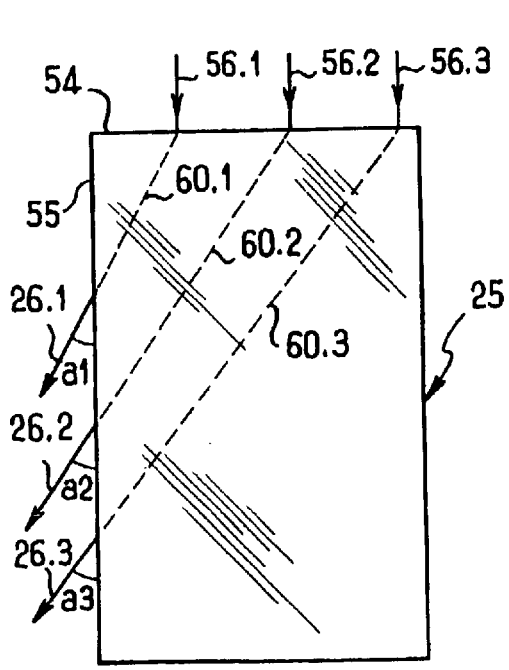
FIG_5
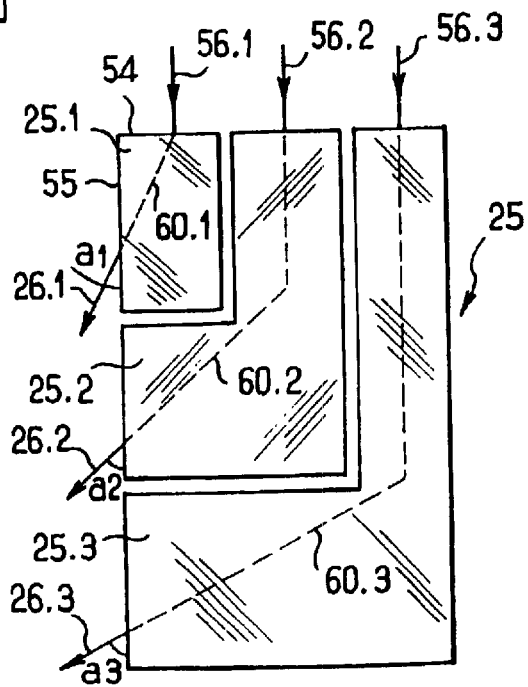
FIG_6

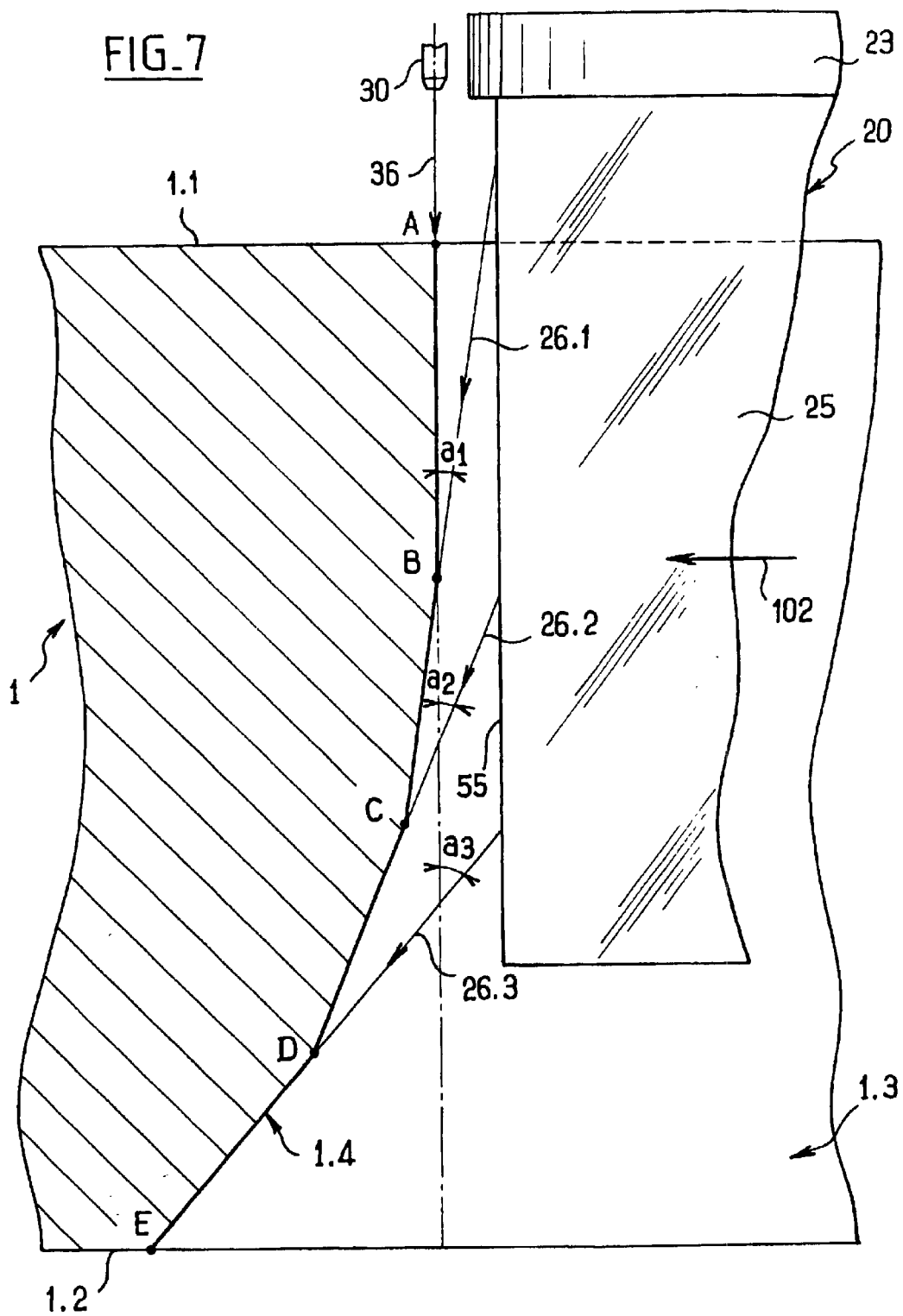

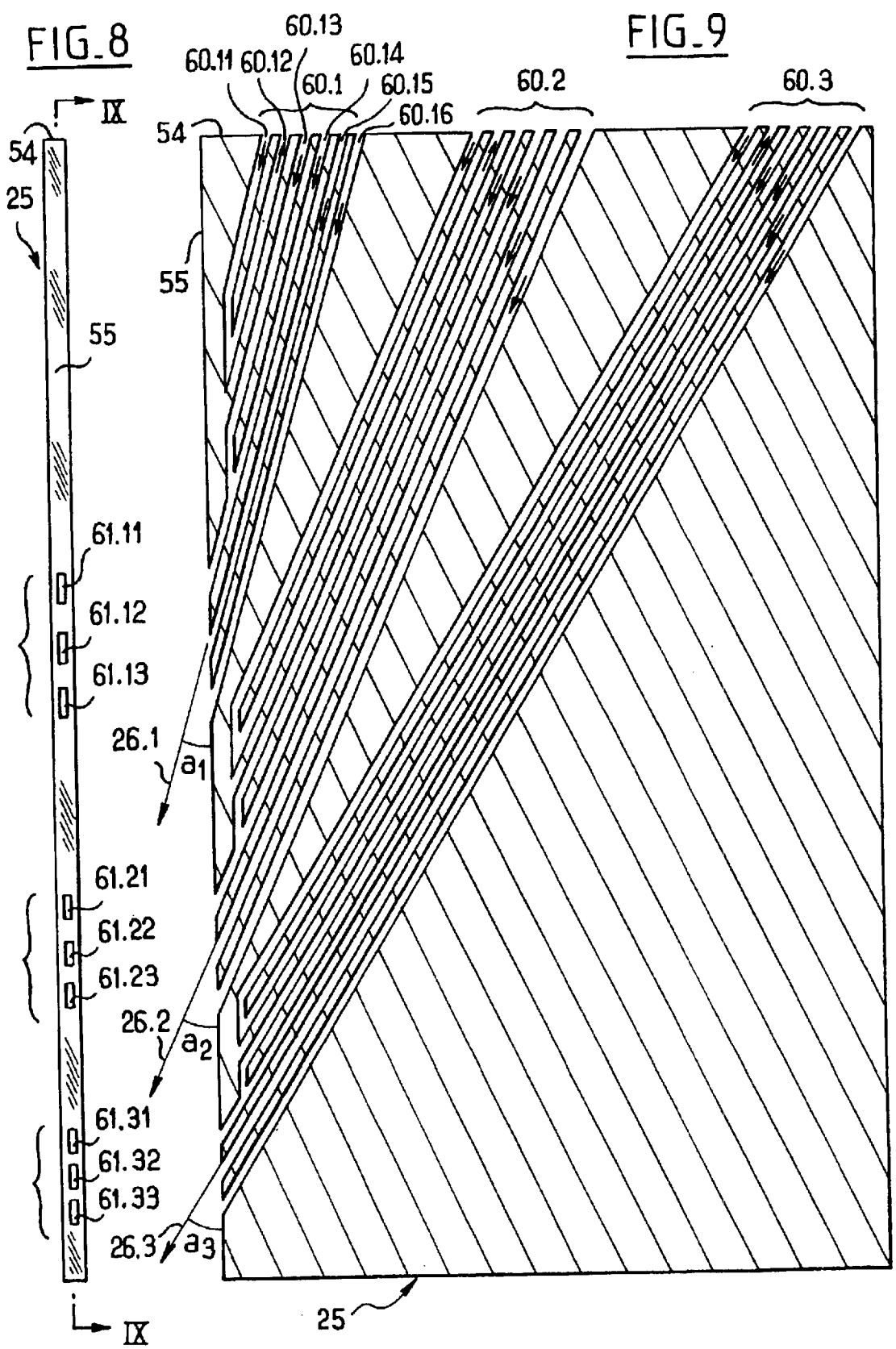

HIGH SPEED OXYACETYLENE CUTTING OF A THICK STEEL PART AND DEVICE THEREFOR

The present invention relates to a method and apparatus for oxygen-cutting pieces of steel, such as slabs, billets, and blooms.

The technical background can be illustrated by document EP-A-0 639 416 which describes a two-line oxygen-cutting installation, each line comprising a moving carriage having a pendulum type oxygen-cutting torch. Reference can also be made to document U.S. Pat. No. 2,820,420 which describes an oxygen-cutting torch cantilevered out from a carriage that can be moved horizontally, and to document WO-A-96/20818 which describes a traveling crane supporting a telescopically-extendable vertical working arm.

In general, conventional oxygen-cutting torches are constituted by two main portions, namely a first portion for delivering fluids (oxygen, fuel gas, cooling liquid), which portion is referred to the torch body, said portion not coming directly into contact with the flame, and a nozzle-forming second portion which does come directly into contact with the flame and which serves to spread and dispense the fluids and to eject the gases (fuel and oxidizer) with specific proportions and characteristics specific to fluid mechanics for the purpose of achieving the desired oxygen-cutting operation.

The person skilled in the art knows that oxygen-cutting nozzles can perform two functions simultaneously: the first function consists in producing a heating flame by supplying and mixing (outside or inside the nozzle) a fuel gas and an oxidizer gas, such as oxygen, for the purpose of raising the cutting edge zone to very high temperature so as to cause the metal for cutting to enter into spontaneous combustion on arrival of a separate jet of oxygen. The second function consists in producing and directing a specific jet of oxygen on the zone that has already been raised to spontaneous combustion temperature so as to cut the metal with desired geometrical characteristics. For this purpose, existing oxygen-cutting nozzles have one or more cutting oxygen ducts, that are optionally parallel, situated in a common plane (generally orthogonal to the cutting surface of the piece to be cut), together with a certain number of heating ducts which are arranged either concentrically around the cutting jet of oxygen, or else on either side of the travel direction of the cutting jets of oxygen.

The oxygen-cutting nozzles used in traditional techniques are positioned at a certain distance from the "cutting" surface of the piece for cutting, with the direction of the cutting jet of oxygen generally being selected to being substantially perpendicular to the cutting surface to improve effectiveness (if the cutting jet of oxygen is orthogonal to the cutting surface, then the thickness of material that needs to be cut through is minimized, thereby enabling the speed of cutting to be maximized and providing savings in fluid consumption).

In general, all of the oxygen-cutting nozzles presently in use are mounted so as to move relative to the piece for cutting, above and/or below said piece, but always outside the cut slot. This constitutes a major drawback insofar as the cutting jet of oxygen needs to travel a considerable distance through the open air between leaving the oxygen-cutting nozzle and striking the surface of the metal to be cut. This drawback naturally increases with increasing thickness of the piece to be cut, and puts a de facto limit on using oxygen-cutting techniques to cutting pieces of relatively small thickness only. This drawback also applies to the heating jet which is generally restricted to heating the impact zone on the surface and/or down to a shallow depth from the surface of the piece. It is the heat given off by the spontaneous combustion of the hot metal due to the cutting oxygen that serves to generate and propagate heat along the cut slot throughout the entire thickness of the piece being cut, thus making it possible to maintain and continue the oxygen-cutting operation by spontaneous combustion using the cutting oxygen. During the cutting process, the jet of oxygen-cutting fluids emitted by the oxygen-cutting torch held at a determined height above the piece forms a slot which passes right through the thickness of the piece that is to be cut. The leading edge of the slot is then substantially rectilinear and in line with the axis of the oxygen-cutting jet, said line moving progressively during the cutting process at a speed referred to the oxygen-cutting speed, which speed corresponds to the speed of travel of the oxygen-cutting torch relative to the piece to be cut. For a nozzle having given geometrical and fluidic characteristics, the oxygen-cutting speed is a function, amongst other things, of the thickness of the piece to be cut: the greater the thickness of the piece, the slower the cutting speed because of combustion heat and combustion itself propagating along the slot from its inlet to its outlet by degrees in non-instantaneous manner.

To fill out the state of the art, mention can also be made of various oxygen-cutting methods that make use of a plurality of torches.

Thus, document U.S. Pat. No. 3,852,126 describes an oxygen-cutting method making use of two torches, a first torch having a vertical axis and a second torch having an oblique axis. That disposition is intended to enable the two torches to be brought together laterally in a direction extending transversely relative to the trajectory so that the two slots overlap in part. Nevertheless, no mention is made of moving the two torches so close together that their respective slots overlap completely, nor is there any mention of inserting one of the torches into the slot made by the other.

Document EP-A-0 017 807 describes oxygen-cutting apparatus presenting a first cutting torch having a vertical axis associated with a second torch for trimming purposes carried by a support blade that passes into the slot, the sole and unique function of the second torch being to rectify the edges of the slot on the face of the piece to be cut that is remote from its face facing the torch.

Finally, the technological background is illustrated by documents JP-A-60 052 985 and U.S. Pat. No. 3,492,552.

Document JP-60 052 985 describes a method of forming an edge with a curved groove by providing for a vertical axis torch to pass in order to obtain a straight cut followed by a torch which is transversely oblique in order to obtain a cut at 45°, and finally followed by a melting torch in order to form the concave edge. Document U.S. Pat. No. 3,492,552 describes a numerically-controlled apparatus for positioning a torch relative to a workpiece.

The invention relates more particularly to oxygen-cutting thick pieces of steel at high speed. It will be understood that existing techniques provide performance that is very limited, both as to the thickness of the piece that can be cut and as to the speed of oxygen-cutting.

The invention seeks to devise an oxygen-cutting technique that enables the above-specified drawbacks and/or limitations to be avoided.

An object of the invention is thus to provide a method and apparatus for oxygen-cutting thick pieces of steel at high speed, being capable of cutting thick pieces of steel in regular and fast manner regardless of the thickness of the piece to be cut. In particular, the looked-for technique must be capable of performing splitting operations under conditions that are technically and economically satisfactory.

According to the invention, this problem is solved by a method of oxygen-cutting a thick piece of steel at high speed in which an oxygen-cutting torch held at a determined height above the piece to be cut is moved and in which a slot torch comprising at least one blade nozzle that passes inside the oxygen-cutting slot is also moved synchronously with the movement of the oxygen-cutting torch, said blade torch emitting at least one jet of heating and/or oxygen-cutting fluids via its leading edge to strike the leading edge of the slot where they combine with the jet of oxygen-cutting fluids emitted by the oxygen-cutting torch to form a leading edge of the slot having a profile in the form of a broken line.

By using a slot torch acting from inside the oxygen cut slot, the above-mentioned drawbacks of the jet of heating and/or oxygen-cutting fluids traveling long distances is avoided, and additionally oxygen-cutting power is increased by increasing the number of oxygen-cutting nozzles if it is desired to have very high power in order to cut through thick pieces, e.g. pieces which are considerably thicker than 10 centimeters (cm). Depending on circumstances, the slot torch can be used as an injection nozzle (single or multiple), serving only to project heating fluids towards the leading edge of the slot.

Preferably, the jet from the oxygen-cutting torch extends in a direction which is substantially perpendicular to the corresponding surface of the piece to be cut, while the jet(s) from the slot torch is/are inclined at a determined acute angle relative to said direction.

Under such circumstances, and advantageously, the slot torch emits a plurality of superposed jets of heating and/or oxygen-cutting fluids engaging the leading edge of the slot at different acute angles, with the values of the angles increasing with increasing distance from the surface of the piece that is engaged by the jet from the oxygen-cutting torch. By using a plurality of superposed jets of oxygen-cutting fluids engaging the same leading edge of the slot at different acute angles, the length of the slot, i.e. the distance between its inlet and its outlet is subdivided into a plurality of segments or "oxygen-cutting steps" by allocating an oxygen-cutting nozzle having its own specific characteristics to each of the segments such that the speed at which the piece is cut is increased considerably, so as to reach the speed possible for a single step. This is thus the first occasion on which a genuine slot nozzle has been used within the oxygen cut slot throughout the cutting process.

Preferably, the oxygen-cutting torch and the slot torch are moved synchronously by mounting their associated supports on a common carriage moving horizontally above the piece to be cut. In particular, the oxygen-cutting and slot torches are movable vertically, the slot torch being retractable above the piece to be cut.

Provision can also be made for the slot torch to be set into vertical vibration during at least a portion of the cutting process. Imparting such vertical vibration facilitates progress of the slot blade along the cut slot as the blade advances during the cutting process.

The invention also provides apparatus for implementing the above-specified oxygen-cutting method, the apparatus being remarkable in that it comprises a horizontally displaceable carriage, said carriage carrying supports for an oxygen-cutting torch and a slot torch, the oxygen-cutting torch being vertically above the piece to be cut and being arranged to emit a substantially vertical jet of oxygen-cutting fluids, while the slot torch has at least one blade nozzle arranged to move inside the cut slot and to emit at least one inclined jet of heating and/or oxygen-cutting fluids from its leading edge.

Preferably, the supports for the oxygen-cutting and slot torches are individually adjustable in vertical position. In particular, the support for the slot torch is suspended from a vertical axis actuator, said actuator having a stroke enabling the blade nozzle(s) to be raised above the piece to be cut.

Provision may optionally be made for the cylinder of the actuator supporting the slot torch to be connected to a vibrator capable of generating low amplitude vibration in a vertical direction.

In a particular embodiment, the blade nozzle of the slot torch is a single nozzle, having a set of internal channels extending obliquely between the top facet and the leading edge of said blade nozzle. Naturally, in a variant, provision can be made for nozzles in the form of multiple blades, each being capable of emitting one or more jets of oxygen-cutting fluids.

In which case it is preferable for the internal channels to be arranged to form at least one group associated with a single jet of heating and/or oxygen-cutting fluids so as to enable the cutting oxygen and/or heating gas to be passed together with a cooling fluid. In particular, the blade nozzle has a plurality of groups of internal channels for producing superposed inclined jets, with the channels in any one group being identically inclined relative to the vertical, and with the angle of inclination increasing from one group to the next going downwards in said blade nozzle.

When the piece being cut is a continuous casting, it is advantageous to provide for the carriage supporting the oxygen-cutting and slot torches to be displaceable transversely to the continuous casting direction, being mounted on a main carriage which moves horizontally above the moving piece in the continuous casting direction, said main carriage having means for temporarily connecting it with said moving piece.

Other characteristics and advantages of the invention appear more clearly in the light of the following description and the accompanying drawings relating to particular embodiments, and in which:

FIG. 4 is a diagrammatic view showing the slot torch used in the method of the invention together with the feeder distributors fitted to the body of the torch, the torch nozzle being a flat nozzle in the form of a blade;

FIGS. 5 and 6 are elevation views showing two different embodiments of the blade nozzle of the slot torch, respectively in the form of a single nozzle emitting a plurality of superposed oblique jets, and in the form of a plurality of complementary nozzles each emitting a single oblique jet;

FIG. 7 is a section view on a much larger scale showing the thick piece while it is being cut, and showing the particular shape of the leading edge of the slot as a broken line made up of segments that result from using a blade nozzle that emits superposed jets of heating and/or oxygen-cutting fluids; and FIG. 8 is an end view of the above-described blade nozzle, while FIG. 9 is a section view on IX—IX of FIG. 8 showing more clearly how the channels inside the blade nozzle are arranged, with this particular example having three groups of internal channels for the purpose of producing superposed inclined jets.

Figure 1:
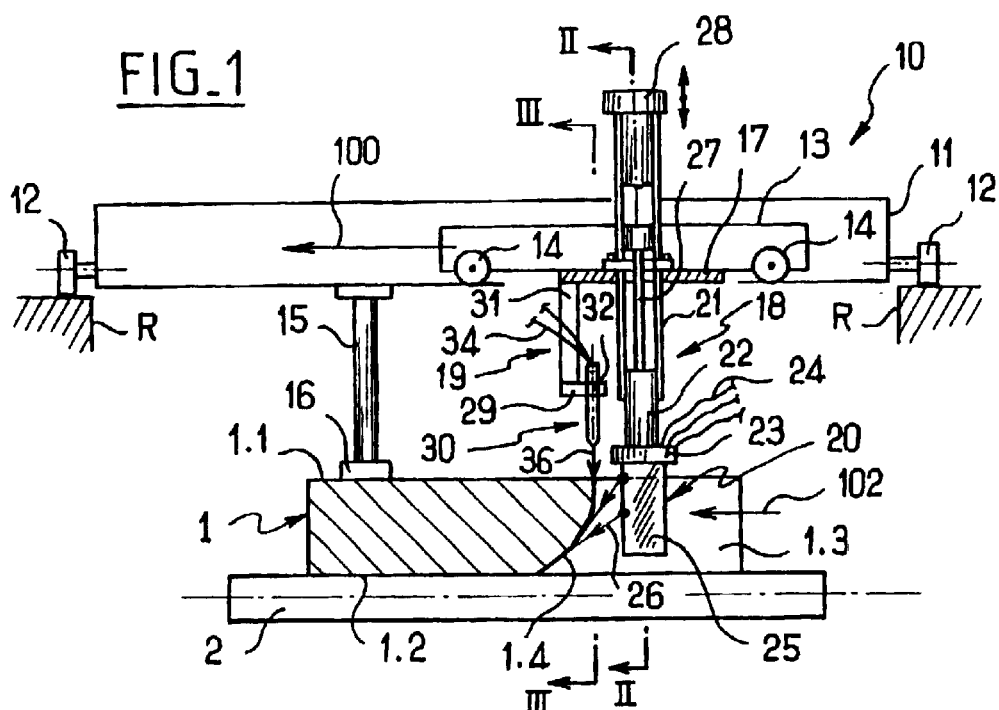
FIG. 1 is a diagram showing an installation implementing the high speed oxygen-cutting method of the invention, which method is applied in this case to cutting a piece that is being cast continuously, said piece being shown in section on a vertical plane contained in the cut slot.
Figure 2:
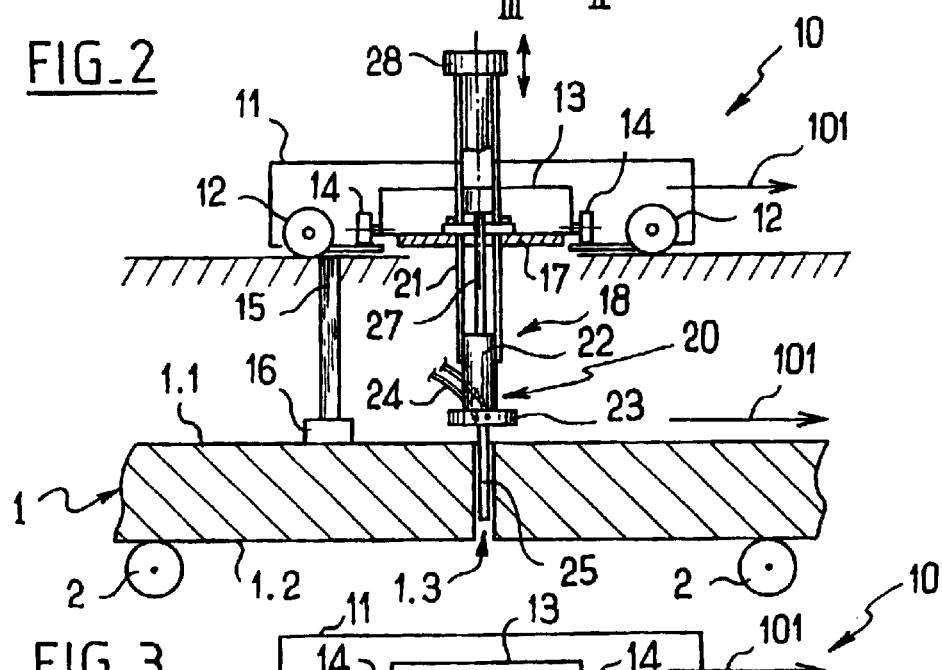
FIGS. 2 and 3 are sections respectively on II—II and III—III of FIG. 1 showing more clearly how the oxygen-cutting torch and the slot torch are disposed respectively during the cutting process.
Figure 3:
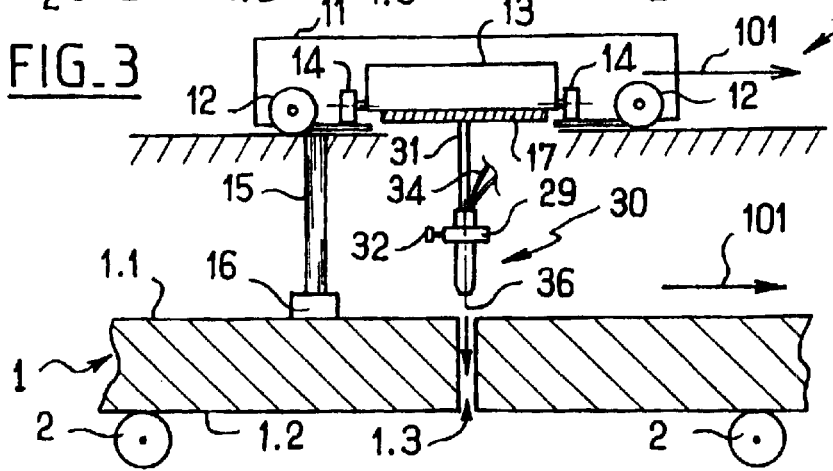

FIGS. 1 to 3 show a piece of steel such as a slab, a billet, or a bloom in the process of being cut by using the high speed oxygen-cutting method of the invention. The piece 1 for cutting has a top surface 1.1 and a bottom surface 1.2, and it rests horizontally on rollers 2. Since this particular piece is a continuous casting, the piece 1 for cutting moves along the rollers 2 in a horizontal direction referenced 101.

In the figures there can be seen apparatus referenced 10 for implementing the high speed oxygen-cutting method of the invention.

This apparatus comprises firstly a first carriage 11 moving on wheels 12 running on a support R, which carriage is referred to as a "tracking" carriage. The carriage 11 moves horizontally over the piece 1 to be cut, and while the cutting method is being implemented, it is even mechanically linked to said piece by means of a support 15 which terminates in a gripping device 16. The structure of this temporary connection means may naturally vary depending on circumstances, and it would be equally possible to use magnetic devices or clamp systems that hold onto the piece for cutting via its side facets.

A second carriage 13 is horizontally movable, having wheels 14 that run on rails secured to the bottom of the carriage 11, with the travel direction referenced 100 of this carriage 13 being perpendicular to the travel direction of the carriage 11. The second carriage 13 can thus be referred to as a "transverse" carriage since it travels transversely to the moving piece 1 in order to cut the piece across its entire width and its entire thickness.

The carriage 13 carries firstly a support 19 for a traditional type of oxygen-cutting torch 30. This oxygen-cutting torch 30 is disposed vertically above the piece to be cut and it is arranged to emit a powerful and substantially vertical jet referenced 36 of heating and oxygen-cutting fluids. The support 19 is connected to a horizontal plate 17 secured to the carriage 13. FIGS. 1 and 3 show the arrangement of this support 19 which comprises a column 31 terminated at its bottom end by a collar 29 holding the oxygen-cutting torch 30, which torch can be taken to a desired vertical position which is adjustable and lockable by means of a positioning screw 32. Reference 34 designates hoses for feeding the various oxygen-cutting fluids. The jet 36 emitted by the oxygen-cutting torch 30 thus engages the top portion of the thickness of the piece. This portion of the leading edge of the slot is thus essentially vertical.

In accordance with an important characteristic of the invention, the carriage 13 also has a support 18 for a slot torch 20. The slot torch 20 comprises a torch body 23 that is extended downwards by a blade nozzle 25 which is arranged to move inside the cut slot referenced 1.3, and which is arranged to emit at least one inclined jet 26 of heating and/or oxygen-cutting fluids through its front edge. In FIG. 1, arrow 102 presents the direction of advance of the oxygen-cutting process, and it can be seen that the blade nozzle 25 moves inside the slot 1.3, with the jets of heating and/or oxygen-cutting fluids that it emits thus engaging the remaining portion of the leading edge of the slot, which edge is referenced 1.4. The body 23 of the slot torch 20 is secured to a column 22 which is connected in this case to the rod 27 of an actuator 21, and specifically a pneumatic actuator. The axis of the actuator 21 is vertical and its cylinder is bolted to the horizontal plate 17.

Thus, the cutting torch 30 and the slot torch 20 are connected via their associated supports 19 and 18 to a common carriage 13 which moves horizontally above the piece to be cut, this common mount thus ensuring that both torches move synchronously during the cutting process. The use of an actuator also makes it possible to adjust the vertical position of the slot torch 20, i.e. the precise position of the blade nozzle 27 so that its jet(s) 26 is/are directed against particular points of the leading edge of the slot with great accuracy. The stroke of the actuator is preferably selected to be such that it is possible to retract the slot torch 20 above the piece when this torch is not in use. The actuator thus enables the blade nozzle(s) 25 to be raised above the piece that is to be cut.

A vibrator 28 is also shown mounted at the top of the cylinder of the actuator 21 supporting the slot torch 20, said vibrator being arranged to generate small-amplitude vibration in a vertical direction. Such vibration makes it easier for the slot nozzle 25 to move inside the slot 13 during the cutting process. As an indication, the amplitude of the vibration can be about 1 millimeter (mm) to 2 mm. The body 23 of the slot torch 20 is also fitted with a plurality of hoses 24 serving to feed the various fluids concerned.

Thus, and in accordance with an essential characteristic of the method of the invention, the oxygen-cutting torch 30 and the slot torch 20 are moved synchronously, the slot torch having at least one blade nozzle 25 traveling actually inside the cut slot 1.3, said blade nozzle emitting at least one jet 26 of heating and/or oxygen-cutting fluids through its leading edge so as to strike the leading edge 1.4 of the slot where it combines with the jet 36 of heating and oxygen-cutting fluids emitted by the oxygen-cutting torch 30 so as to form a leading edge 1.4 of the slot having a profile in the form of a broken line.

It should be observed in FIG. 1 that the jet 36 of the oxygen-cutting torch 30 extends in a direction which is substantially perpendicular to the corresponding surface 1.1 of the piece to be cut, whereas the jet(s) 26 of the slot torch 20 is/are inclined at a determined acute angle relative to said direction. The importance of the inclination of the slot torch jet is described in greater detail below, in particular with reference to FIGS. 8 and 9.

The blade nozzle 25 of the slot torch 20 may be constituted as a single part as shown in FIG. 5 or as a plurality of parts as shown in FIG. 6.

In FIG. 5, the blade nozzle 25 has a set of internal channels 60.1, 60.2, and 60.3 which extend obliquely between the top facet 54 and a leading edge 55 of said blade nozzle. The associated inlets are referenced 56.1, 56.2, and 56.3, while the jets of heating and oxygen-cutting fluids that leave via the leading edge 55 of the blade 25 are referenced 26.1, 26.2, and 26.3. The associated outlet angles referenced a1, a2, and a3 are preferably different, intersecting downwards away from the blade nozzle 25.

In FIG. 6 there is shown a variant in which the blade nozzle 25 is made up of a plurality of parts, i.e. it comprises three blade nozzle subassemblies 25.1, 25.2, and 25.3. Each subassembly has its own fluid inlets respectively referenced 56.1, 56.2, and 56.3, and its own outlets for heating and/or oxygen-cutting fluids in the form of oblique jets respectively referenced 26.1, 26.2, and 26.3. The internal channels 60.1, 60.2, and 60.3 are then arranged accordingly inside the thickness of each of these three components making up the blade nozzle 25.

It will be understood that the number of internal channels used for emitting superposed inclined jets will vary in practice as a function of the operating conditions encountered.

The views of FIGS. 5 and 6 are clearly diagrammatic insofar as each of the channels 60.1, 60.2, and 60.3 is in fact made up of a group of channels associated with the various fluids making up any one outlet jet. Thus, there are channels for heating gas, for cutting oxygen, and for cooling fluid. If it is desired to use the slot torch as a single or multiple injection nozzle, then the fluids that are ejected and projected against the leading edge of the slot are constituted solely by heating fluids.

FIG. 4 shows more clearly how the body 23 of the slot torch 20 is arranged for fluid feed purposes. The outline of the body of the torch 23 is represented by a chain-dotted line, and it includes a plurality of feeder distributors, each associated with a different one of the fluids involved. Reference 60 designates the various internal channels provided in the thickness of the head of the blade nozzle 25. In order to feed these various channels, there is a first distributor 40 having an inlet 41 for cutting oxygen, which oxygen is delivered via a tube 43, a distributor 44 for feeding heating gas having inlets 45 and 46 corresponding to fuel gas and to oxygen, these gases being delivered via associated tubes 47 and 48, and finally there is a distributor 49 for feeding cooling fluid, e.g. water, having a water inlet 50 and a water outlet 51, connections being provided via associated respective tubes 52 and 53.

It should be observed that during the cutting process the blade nozzle 25 moves inside the cut slot, thus producing a non-negligible advantage in terms of heating insofar as the oxygen-cutting fluids are naturally preheated, with this being particularly advantageous for the cutting oxygen. The cutting oxygen duct is heated by heat from the oxygen-cutting operations, and also by the radiant heat from the cut piece if it is still hot, as is the case for continuously cast steel slabs. This heat is transferred to the oxygen-cutting fluids which act to cool the blade and to exchange heat, thus enabling heat to be delivered to the combustion which requires it.

As mentioned above, it is the combination of the jets from the oxygen-cutting torch and from the slot torch that enables oxygen-cutting to be performed at high speed, even when the piece to be cut is very thick.

The inclination of the jet(s) 26 from the slot torch 20 has the effect of forming a leading edge 1.4 in the slot whose profile follows a broken line. If the slot torch 20 has a blade nozzle emitting a single jet 26 of oxygen-cutting fluid, then the leading edge 1.4 of the slot is made up of two segments only, comprising a vertical segment associated with the jet 36 from the oxygen-cutting torch 30, and an oblique segment associated with the jet 26 from the slot torch 20. Nevertheless, in practice, it is advantageous to provide a plurality of superposed jets, and one such example is shown in FIG. 7.

Specifically, the blade nozzle 25 has three groups of internal channels for emitting three superposed jets 26.1, 26.2, and 26.3 of oxygen-cutting fluids. Each of these jets gives an associated oblique shape to the leading edge 1.4 of the slot. In this case, the zone referenced AB belongs to the outside oxygen-cutting torch 30 whose jet 36 is perpendicular to the cutting surface 1.1. The other three segments referenced BC, CD, and DE correspond respectively to the inclined jets 26.1, 26.2, and 26.3 emitted by the blade nozzle 25 of the slot torch 20. The corresponding angles of inclination relative to the vertical are referenced a1, a2, and a3. The broken line ABCDE, constituted in this case by four segments, forms the leading edge 1.4 of the oxygen-cutting slot. In the example shown in FIG. 7, the three zones associated with the three nozzle cutting steps of the blade nozzle 25, i.e. BC, CD, and DE are substantially equal in length. In contrast, the zone AB associated with the outside torch is a little longer, because of the desired level of power given to the oxygen-cutting torch 30. Nevertheless, it should be understood that this distribution can be modulated as a function of circumstances, and the angles of inclination a1, a2, and a3 are selected accordingly so as to obtain zones having the desired lengths. By way of example, more importance could be given to the last step by increasing the angle a3 so as to increase the length of the segment DE.

It will thus be understood that each individual oxygen-cutting fluid jet is required to cut only a portion of the thickness of the piece that is to be cut, i.e. only one of the four above-mentioned segments, with this sharing of the work making it possible specifically to achieve very high oxygen-cutting speeds in spite of the great thickness of the piece to be cut.

The way in which the internal channels in the blade nozzle 25 are arranged in order to deliver three superposed jets 26.1, 26.2, and 26.3 of heating and/or oxygen-cutting fluids will be better understood on referring to FIGS. 8 and 9.

In FIG. 9 it can be seen that the blade nozzle 25 of the slot torch, a single nozzle in this example, presents a set of internal channels comprising a plurality of groups, each being associated with a respective jet of heating or oxygen-cutting fluids. Specifically, an embodiment is shown that has three groups of internal channels respectively referenced 60.1, 60.2, and 60.3. Each of these groups itself comprises a plurality of inclined internal channels, with all the channels in any one group having the same slope.

Individual references are given to the internal channels of the first group 60.1 of channels, it being understood that this group which constitutes the first step is subsequently repeated, but with a different slope each time.

Thus, there can be seen in succession going away from the outlet edge 55: a channel 60.11 associated with the cooling water inlet; a channel 60.12 associated with the cooling water outlet; a channel 60.13 associated with the heating fuel gas inlet; a channel 60.14 associated with the heating oxygen inlet (it should be observed that these two channels 60.13 and 60.14 join together upstream from the outlet so as to open out via a single channel); and two channels 60.15 and 60.16 corresponding to the cutting oxygen outlet. These six channels 60.11 to 60.16 form a single oxygen-cutting "step", which step is characterized by its angle of inclination a1. The other groups of channels 60.2 and 60.3 are arranged in analogous manner, but their respective inclinations a2 and a3 increase progressively going downwards through the blade nozzle 25.

FIG. 8 shows the associated outlet orifices in the leading edge 55 of the blade nozzle 25: for each group of channels associated with a particular oxygen-cutting step, there are to be found in succession going downwards: an orifice 61.11 associated with the outlet of heating gas; and two orifices 61.12 and 61.13 associated with delivering cutting oxygen.

As just described, all of the oxygen-cutting steps can be incorporated in a single oxygen-cutting blade, or else each oxygen-cutting step can be constituted by an independent blade, as mentioned previously.

The simultaneous action of the oxygen-cutting step at different individual angles of inclination serves to share the total length of the leading edge of the oxygen-cutting slot amongst the various oxygen-cutting steps, preferably in uniform manner or in a manner that is proportional to the power of the nozzle of each oxygen-cutting step, thereby enabling the time required to cut through the total thickness to be reduced to the time required to cut through the smaller thickness treated by the nozzle of each individual oxygen-cutting step.

As mentioned above, the open channels of one or more of the groups of channels could be used solely to project heating fluids towards the heating edge of the slot. It is thus possible to provide one or more injection nozzles that are received directly in the slot.

Finally, in order to facilitate manufacture and connection of such a multiple-channel blade, it is possible to make use of bent tubes having upstream ends of round section (for ease of connection to a feeder distributor), with the remainder thereof being of flat section (to minimize size in a lateral direction).

A method and apparatus are thus provided for high speed oxygen-cutting that enables thick pieces of steel to be cut, in particular pieces that are considerably greater than 10 cm in thickness. The method and the apparatus of the invention are naturally equally applicable to a piece that is stationary or to a piece that is being cast continuously.

The invention is not limited to the embodiments described above, but on the contrary covers any variant using equivalent means to reproduce the essential characteristics specified above.

What is claimed is:

1. A method of oxygen-cutting a piece of steel at high speed comprising:

moving an oxygen-cutting torch, which is maintained at a height above the piece to be cut and cutting a slot within said piece;

disposing a slot torch (20) comprising at least one blade nozzle (25) inside the slot (1.3);

moving the slot torch (20) synchronously with the movement of the oxygen cutting torch (30) and emitting at least one jet (26) of heating and/or oxygen cutting fluids from said at least one blade nozzle, wherein the at least one jet of heating and/or oxygen cutting fluids from the blade nozzles strike a leading edge (1.4) of the slot and combine with a jet (36) of the oxygen cutting fluids emitted by the oxygen cutting torch (30) to form a leading edge (1.4) of the slot.

2. A method according to claim 1, wherein the jet (36) from the oxygen-cutting torch (30) extends in a direction which is substantially perpendicular to the corresponding surface (1.1) of the piece to be cut, while the jet(s) (26) from the slot torch (20) is/are inclined at a determined acute angle relative to said direction.

3. A method according to claim 2, wherein the slot torch (20) emits a plurality of superposed jets (26.1, 26.2, 26.3) of heating and/or oxygen-cutting fluids engaging the leading edge (1.4) of the slot at different acute angles, with the values of the angles increasing with increasing distance from the surface (1.1) of the piece that is engaged by the jet (36) from the oxygen-cutting torch (30).

4. A method according to claim 1, wherein the oxygen-cutting torch (30) and the slot torch (20) are moved synchronously by mounting associated supports (19; 18) on a common carriage (13) moving horizontally above the piece to be cut.

5. A method according to claim 1, wherein the oxygen-cutting and slot torches (30; 20) are movable vertically, the slot torch (20) being retractable above the piece to be cut.

6. A method according to claim 1, wherein the slot torch (30) is set into vertical vibration during at least a portion of the cutting process.

7. Apparatus for implementing the oxygen-cutting of a work piece, comprising:

an oxygen cutting torch (30);

a slot torch (20);

a horizontally displaceable carriage (13), said carriage carrying supports (19; 18) for said oxygen-cutting torch (30) and said slot torch (20), the oxygen-cutting torch (30) being vertically above the work piece and being arranged to emit a substantially vertical jet (36) of oxygen-cutting fluids, while the slot torch (20) has at least one blade nozzle (25) arranged to move inside the cut slot (1.3) and to emit at least one inclined jet (26) of heating and/or oxygen-cutting fluids from its leading edge.

8. Apparatus according to claim 7, wherein the supports (19; 18) for the oxygen-cutting and slot torches (30; 20) are individually adjustable in vertical position.

9. Apparatus according to claim 8, wherein the support (18) for the slot torch (20) is suspended from a vertical axis actuator 921), said actuator having a stroke enabling the blade nozzle(s) (25) to be raised above the piece to be cut.

10. Apparatus according to claim 9, wherein the cylinder of the actuator (21) supporting the slot torch (20) is connected to a vibrator (28) capable of generating low amplitude vibration in a vertical direction.

11. Apparatus according to claim 7, wherein the blade nozzle (25) of the slot torch (20) is a single nozzle, having a set of internal channels (60.1, 60.2, 60.3) extending obliquely between a top facet (54) and a leading edge (55) of said blade nozzle.

12. Apparatus according to claim 11, wherein the internal channels (60.1, 60.2, 60.3) are arranged to form at least one group associated with a single jet of heating and/or oxygen-cutting fluids so as to enable the cutting oxygen and/or heating gas to be passed together with a cooling fluid.

13. Apparatus according to claim 12, wherein the blade nozzle (25) has a plurality of groups of internal channels (60.1, 60.2, 60.3) for producing superposed inclined jets (26.1, 26.2, 26.3), with the channels in any one group being identically inclined relative to the vertical, and with the angle of inclination increasing from one group to the next going downwards in said blade nozzle.

14. Apparatus according to claim 7, for oxygen-cutting a piece that is being cast continuously, wherein the carriage (13) supporting the oxygen-cutting and slot torches (30; 20) is displaceable transversely to the continuous casting direction (101), being mounted on a main carriage (11) which moves horizontally above the moving piece in the continuous casting direction, said main carriage having means (15, 16) for temporarily connecting it with said moving piece.

* * * * *